United States Patent
Wollen

(10) Patent No.: US 8,932,047 B2
(45) Date of Patent: Jan. 13, 2015

(54) PROPELLANT FLOW ACTUATED PIEZOELECTRIC IGNITER FOR COMBUSTION ENGINES

(75) Inventor: Mark A. Wollen, Murieta, CA (US)

(73) Assignee: Innovative Engineering Solutions, Inc., San Diego, CA (US)

( * ) Notice: Subject to any disclaimer, the term of this patent is extended or adjusted under 35 U.S.C. 154(b) by 1094 days.

(21) Appl. No.: 12/906,360

(22) Filed: Oct. 18, 2010

(65) Prior Publication Data

US 2012/0094241 A1    Apr. 19, 2012

(51) Int. Cl.
*F23Q 7/12* (2006.01)
*H02N 2/18* (2006.01)
*F02P 3/12* (2006.01)
*F23Q 3/00* (2006.01)

(52) U.S. Cl.
CPC *H02N 2/183* (2013.01); *F02P 3/12* (2013.01); *F23Q 3/002* (2013.01); *H02N 2/185* (2013.01)
USPC .......... 431/255; 292/251.5; 292/252; 292/10; 137/529; 251/65

(58) Field of Classification Search
CPC ................................ F23Q 3/002; F23Q 2/287
USPC .......... 431/255; 292/251.5, 252, 10; 137/529; 251/65
See application file for complete search history.

(56) References Cited

U.S. PATENT DOCUMENTS

| | | | | |
|---|---|---|---|---|
| 3,620,660 | A * | 11/1971 | Laurent | 431/255 |
| 3,802,828 | A * | 4/1974 | Mercer et al. | 431/255 |
| 3,865,539 | A * | 2/1975 | Burge et al. | 431/255 |
| 3,936,678 | A * | 2/1976 | Mohr | 310/339 |
| 4,001,615 | A * | 1/1977 | Berlincourt | 310/339 |
| 7,397,170 | B2 | 7/2008 | Ichikawa | |
| 7,555,938 | B2 | 7/2009 | Bargatin et al. | |
| 7,565,795 | B1 | 7/2009 | Horn et al. | |
| 7,578,279 | B2 | 8/2009 | Ehresman | |
| 2008/0147007 | A1 * | 6/2008 | Freyman et al. | 604/151 |
| 2009/0173321 | A1 | 7/2009 | Horn et al. | |
| 2009/0236441 | A1 | 9/2009 | Hess et al. | |

* cited by examiner

*Primary Examiner* — Kenneth Rinehart
*Assistant Examiner* — Gajanan M Prabhu
(74) *Attorney, Agent, or Firm* — Harry V. McGahey, Esq.

(57) ABSTRACT

A propellant flow actuated piezoelectric igniter device using one or more hammer balls retained by one or more magnets, or other retaining method, until sufficient fluid pressure is achieved to release and accelerate the hammer ball, such that it impacts a piezoelectric crystal to produce an ignition spark. Certain preferred embodiments provide a means for repetitively capturing and releasing the hammer ball after it impacts one or more piezoelectric crystals, thereby oscillating and producing multiple, repetitive ignition sparks. Furthermore, an embodiment is presented for which oscillation of the hammer ball and repetitive impact to the piezoelectric crystal is maintained without the need for a magnet or other retaining mechanism to achieve this oscillating impact process.

26 Claims, 7 Drawing Sheets

PROPELLANT FLOW ACTUATED PIEZOELECTRIC IGNITER FOR COMBUSTION ENGINES

STATEMENT REGARDING FEDERALLY SPONSORED RESEARCH OR DEVELOPMENT

A portion of the research related to an embodiment of the present invention was partially funded by a Federally funded government contract under NASA Small Business Research and Development (SBIR) Phase I contract number NNX10CD19P, issued to Innovative Engineering Solutions on 29 Jan. 2010 and completed on 29 Jul. 2010.

CROSS REFERENCE TO RELATED APPLICATIONS

Not Applicable

DESCRIPTION OF ATTACHED APPENDIX

Not Applicable

BACKGROUND OF THE INVENTION

Because of the severe stress put on the ignition of rocket engines in rocket powered systems, gas turbine engines, and other similar combustion devices, and the catastrophic result of a failure to timely and reliably ignite them, there has always been a need for a reliable engine igniter which would be able to be accurately timed to ignite when desired.

Piezoelectric crystals have been used commonly as spark ignition sources for stoves and barbecue lighters, but the actuation mechanism usually consists of a mechanically actuated hammer that is driven by some sort of spring mechanism.

Prior piezoelectric ignition systems have been patented but in prior patented devices it is not clear that as a practical matter sufficient force will be generated by any of the described methods, or that the impulse applied to the crystal will be of sufficient magnitude or be applied at a rapid enough rate to produce a strong spark.

Information relevant to attempts to address these and other problems can be found in U.S. Patent Application and U.S. Patent Nos. 2009/0236441 A1, 2009/0173321 A1, U.S. Pat. Nos. 7,578,279 B2, 7,565,795 B1, 7,555,938 B2, 7,397,170 B2. However, each one of these references suffers from one or more of the above disadvantages related to insufficiency of spark strength:

In an attempt to produce a satisfactory spark strength, some prior patents have attempted to solve this problem by describing possible methods of spreading the gas pressure over a larger area, and attempting to increase the force applied to the piezoelectric crystal proposing to use impingement of the gas force directly onto the piezoelectric crystal, or through an attached intermediary connecting element, but to date none of these prior inventions have been practically successful in solving this problem. Others have used a fluidic oscillator as a means of repetitively exciting a piezoelectric crystal, however a description of such a necessary fluidic oscillator is not provided. Specifically, although force conveying elements means connecting the source of fluid pressure to the piezoelectric crystal are mentioned, no actual specific means of using the fluid pressure to accelerate a solid mass to a high enough velocity, so as to subsequently impact the crystal or connected force conveying elements, is specified. A specific method, hitherto unknown, is critical for actually being able to obtain a sufficiently strong, reliable spark from the piezoelectric crystal of sufficient strength to ignite a rocket engine, a gas turbine engine, or other combustion device and this is precisely what the embodiment of the present invention disclosed in this patent provides.

The embodiment of the present invention presently disclosed overcomes these shortcomings by retaining a hammer ball in a controlled manner until sufficient energy has been stored in the actuating gas to then accelerate the hammer ball to sufficient velocity to attain sufficient rapid impulse necessary to obtain a strong piezoelectric crystal response.

Although the shape of the hammer element in the preferred embodiment is referred to as a ball, and it is presently envisioned that this spherical shape might be desirable, it is by no means the only shape that might be employed for the sliding hammer element.

For the foregoing reasons, there is a need for a specific method to produce a sufficiently and reliably strong spark response so as to be able to ignite a rocket or other similar type of propulsion system.

SUMMARY

The present invention is directed to an apparatus that satisfies the need to produce a sufficiently and reliably strong spark response so as to be able to ignite a rocket engine, gas turbine engine, or other similar type of propulsion system. The primary object of the invention is to provide a better method of igniting rocket propulsion systems.

Another object of the invention is to provide a piezoelectric igniter which is simpler in design, installation, and operation than any currently existing device. Unlike other rocket engine igniter systems to date, no electronics or wiring is required to generate the ignition spark in the present invention.

Another object of the invention is to provide a rocket propulsion ignition system which is aimed at, but not limited to, taking advantage of the fluid dynamics of the propellant flow to excite a piezoelectric crystal.

Other objects and advantages of the present invention will become apparent from the following descriptions, taken in connection with the accompanying drawings, wherein, by way of illustration and example, several alternative embodiments of the present invention are disclosed.

In accordance with one preferred embodiment of the invention, there is disclosed a propellant flow actuated piezoelectric rocket engine igniter comprising a fuel supply line connected to a fuel inlet valve, an oxidizer supply line connected to an oxidizer inlet valve, the fuel inlet valve connected to an upstream gas chamber, a magnet, a hammer ball held next to the magnet by magnetic force, a hammer ball guide tube ("guide tube") surrounding the hammer ball to guide the hammer ball when it is released from the magnet, a piezoelectric crystal at the opposite distal end of the guide tube, flow by-pass pathway on the guide tube connected to an injector tube, an injector tube surrounding the piezoelectric crystal connected to the guide tube, an ignition zone at one end of the injector tube, a conduction path electrode leading from the piezoelectric crystal to the ignition zone, a high dielectric strength insulating material surrounding the conduction path electrode, a discharge spark created when the hammer ball strikes the piezoelectric crystal, and a grounding connection for the piezoelectric crystal. By the term "high dielectric strength" is meant the commonly understood property of an insulating material, describing the maximum electric field strength that the insulating material can withstand intrinsically without experiencing failure of its insulating properties.

Also is shown a second alternative preferred embodiment of the embodiment of the present invention, disclosing an igniter comprising a fuel supply line connected to a fuel inlet valve, an oxidizer supply line connected to an oxidizer inlet valve, the fuel inlet valve connected to an upstream gas chamber, a magnet, a hammer ball held next to the magnet by magnetic force, a guide tube surrounding the hammer ball to guide the hammer ball when it is released from the magnet, two piezoelectric crystals, each with upstream charging chambers, flow by-pass pathway on the guide tube connected to an injector tube, an injector tube surrounding the piezoelectric crystals connected to the guide tube, an ignition zone at one end of the injector tube, a conduction path electrode leading from the piezoelectric crystals to the ignition zone, a high dielectric strength insulating material surrounding the conduction path electrode, a discharge spark created when the hammer ball strikes the piezoelectic crystal, and a grounding connection for the piezoelectric crystals.

In accordance with a third embodiment of the present invention, there is disclosed an igniter comprising a fuel supply line connected to a fuel inlet valve, an oxidizer supply line connected to an oxidizer inlet valve, the fuel inlet valve connected to an upstream gas chamber, a magnet, a hammer ball held next to the magnet by magnetic force, a guide tube surrounding the hammer ball to guide the hammer ball when it is released from the magnet, a piezoelectric crystal attached to a magnet creating an anvil magnet at the opposite distal end of the guide tube, a return anvil magnet, an isolated return gas chamber surrounding the piezoelectric crystal, a return chamber gas supply means, a primary charging orifice, a secondary charging orifice, a return chamber seal, flow by-pass pathway on the guide tube connected to an injector tube, an injector tube surrounding the piezoelectric crystal connected to the guide tube, an ignition zone at one end of the injector tube, a conduction path electrode leading from the piezoelectric crystal to the ignition zone, a high dielectric strength insulating material surrounding the conduction path electrode, a discharge spark created when the hammer ball strikes the piezoelectric crystal, and a grounding connection for the piezoelectric crystal.

BRIEF DESCRIPTION OF THE DRAWINGS

The drawings constitute a part of this specification and include exemplary embodiments of the present invention, which may be embodied in various forms. It is to be understood that in some instances various aspects of the embodiment of the present invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
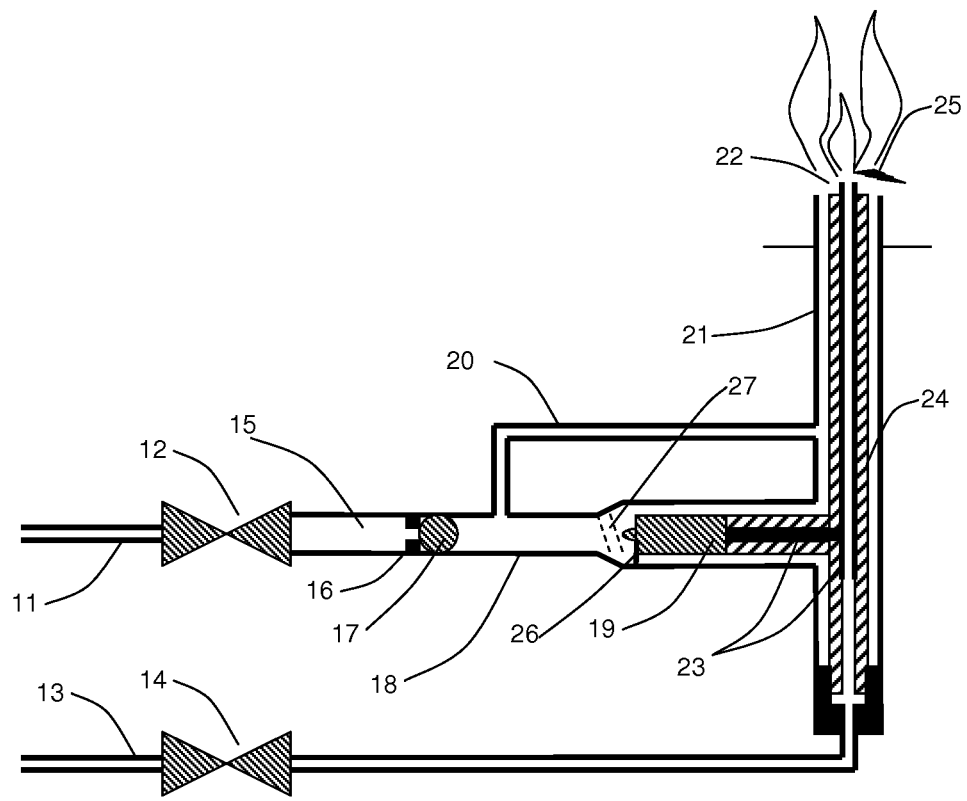
FIG. 1 is a schematic diagram illustrating the parts of a basic embodiment of the present invention.

FIG. 1 shows the configuration of a basic embodiment of the present invention.

A fuel supply line (11) is connected to a fuel inlet valve (12), and an oxidizer supply line (13) is connected to an oxidizer inlet valve (14). The fuel inlet valve (12) is connected to an upstream gas chamber (15). A magnet (16) holds a hammer ball next to itself by magnetic force. A guide tube (18) surrounds the hammer ball (17) to guide the hammer ball (17) when it is released from the magnet (16) into a piezoelectric crystal (19) located at the opposite distal end of the guide tube (18). A flow by-pass pathway (20) on the guide tube (18) is connected to an injector tube (21) surrounding the piezoelectric crystal (19) connected to the guide tube (18). There is an ignition zone (22) at one end of the injector tube (21) and a conduction path electrode (23) leading from the piezoelectric crystal (19) to the ignition zone (22). A high dielectric strength insulating material (24) surrounds the conduction path electrode (23). There is a grounding connection for the piezoelectric crystal (26) and a discharge spark (25) is created when the hammer ball (17) strikes the piezoelectric crystal (19).

A fuel supply line (11) is connected to, and provides flow to the fuel inlet valve (12), and an oxidizer supply line (13) provides oxidizer flow to the oxidizer inlet valve (14). When fuel and oxidizer inlet valves are opened, fuel gas pressure increases in upstream chamber (15), until gas pressure is sufficiently high that the magnet (16) can no longer retain the hammer ball (17). The hammer ball (17) then separates from the magnet (16), allowing gas to flow through or around the magnet and accelerate the hammer ball through the guide tube (18) towards the piezoelectric crystal (19).

The hammer ball (17) may uncover a flow by-pass path (20) at one or more points, allowing additional gas to be supplied to the downstream injector tube (21) and finally to the ignition zone (22) at the end of the injector tube, where the fuel and oxidizer mix.

Alternatively, leakage of flow past hammer ball (17) as it moves through the guide tube (18) is also routed to the injector tube (21), to supply combustion fuel to ignition zone (22) without the need for the flow by-pass path (20).

When the hammer ball (17) impacts the piezoelectric crystal (19), a high electrical voltage is generated across the piezoelectric crystal. This high electrical voltage is conducted along the conduction path electrode (23), which is insulated by high dielectric strength insulating material (24) to assure that the discharge spark (25) occurs at the ignition zone (22).

In the embodiment as shown in FIG. 1, the discharge spark occurs at the ignition zone (22), between the conduction path electrode (23) and the injector tube (21), because the electrical path is completed back to the piezoelectric crystal (19) by means of a grounding wire (26). This is one possible method for completing the electrical circuit, and, alternatively, insulated wires or other electrical conduction methods could be employed to convey the electrical energy generated by the piezoelectric crystal (19) to the ignition zone (22).

Following use, when the fuel inlet valve (12) is closed, an optional return spring (27), or other mechanism, might be employed as a return means to return the hammer ball (17) to the magnet (16). Alternatively, the magnet might be sufficiently strong, or gravity might be employed, to return the hammer ball, without the need for return spring (27) or some other return mechanism.

An adjustable separator means may be placed between the hammer ball and the magnet so as to be able to adjust the amount of magnetic force holding the hammer ball in place. By properly sizing the upstream chamber (15), strength of magnet (16), length of guide tube (18), location of flow by-pass path (20), and other geometrical characteristics, the igniter assembly can be made to supply a discharge spark of sufficient magnitude, and at a time that coincides with a large combustible mixture of gases being present at the ignition zone, such that reliable ignition is achieved. A variety of engineering and analysis methods may be used to size these parameters.

Although this embodiment shows fuel gas being used to operate the hammer ball and oxidizer being delivered through the core of the injector tube (21), other embodiments may use oxidizer gas, combustible fuel gas, or even a third inert gas, to operate the hammer ball.

In general, the ignition device is intended to be operated with the fuel, oxidizer, or other inert fluid driving hammer ball (17) into piezoelectric crystal (19) in a gaseous state, or changing from a liquid state to a gaseous state as would happen, for example, if a cryogenic propellant such as liquid hydrogen or liquid oxygen were supplied to the upstream gas chamber (15). The other propellant, which is delivered to the ignition zone (22) for combustion and does not play a role in actuating the piezoelectric crystal, might be delivered in either a gaseous or liquid state.

Furthermore, although FIG. 1 shows the propellant which actuates the piezoelectric crystal (19) being delivered to the annular portion of the injector tube (21), and the propellant not playing a role in the actuation process being delivered up the center core of the injector tube, this is not critical to the operation of the igniter. It might be desirable for combustion efficiency or other reasons to deliver the propellant used to actuate the piezoelectric crystal through the core, and the other propellant through the annular region, or to use a downstream flow path and injector geometry different than the coaxial arrangement shown.

In other embodiments, the electrode may be a hollow tube or a solid rod.

FIGS. 2 through 5 describe the sequence of steps that occur when the device is operated.

Figure 2:
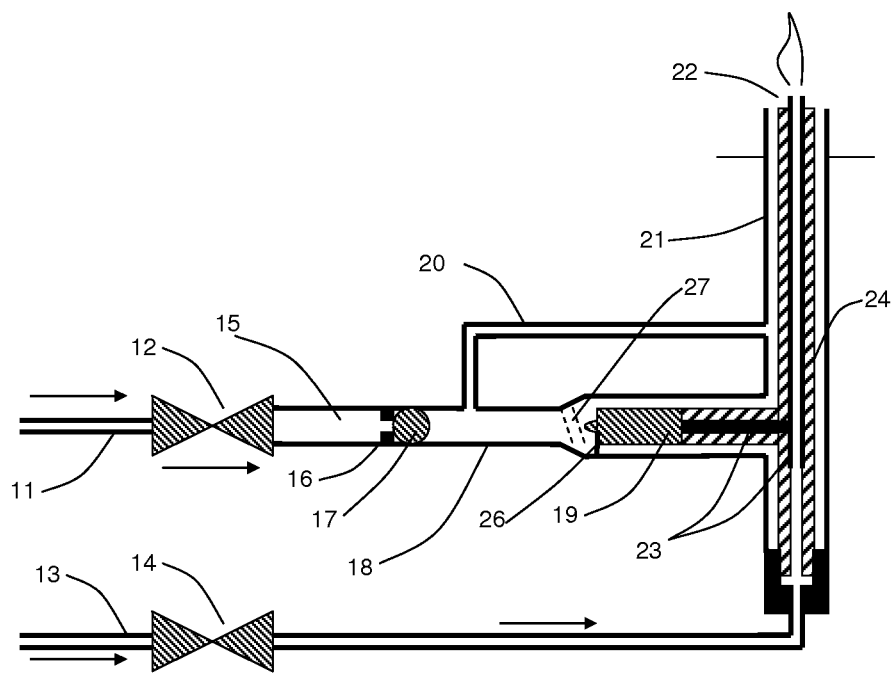
FIG. 2 is a schematic diagram illustrating the first step in the sequence of operation of the embodiment of the present invention when the fuel and oxidizer valves have just been opened.

In FIG. 2, the Fuel Inlet Valve (12) and Oxidizer Supply Valve (14) have just been opened. Oxidizer begins flowing to the ignition zone (22), while gaseous fuel flows into and builds pressure in the upstream gas chamber (15).

Figure 3:
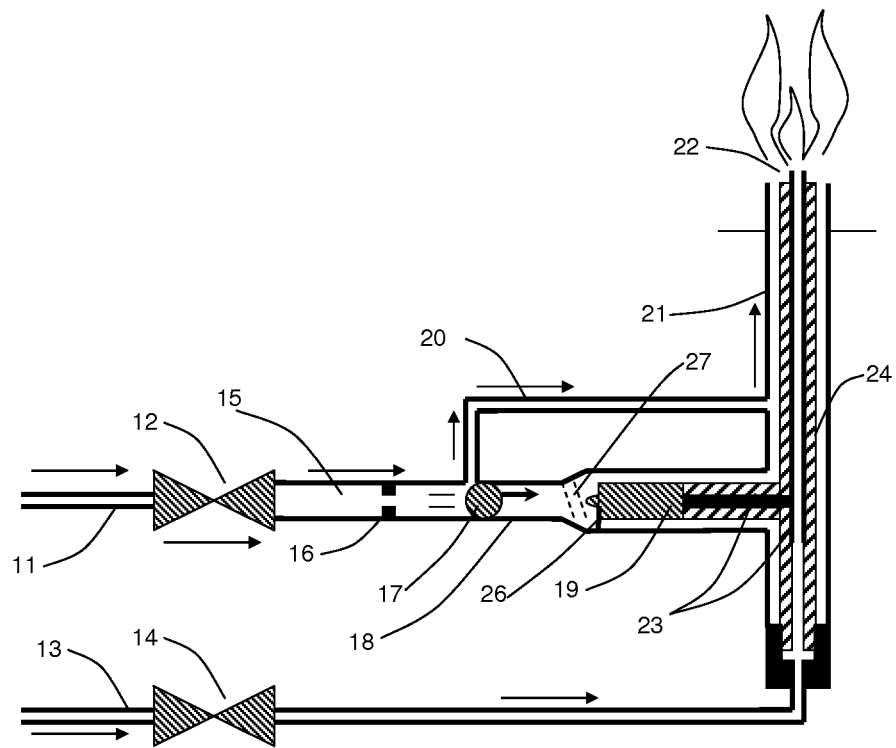
FIG. 3 is a schematic diagram illustrating the second step in the sequence of operation of the embodiment of the present invention when the hammer ball has been released.

In FIG. 3, pressure in the upstream gas chamber (15) has reached a level sufficient to cause the hammer ball (17) to be released from magnet (16). When the hammer ball uncovers the flow by-pass path (20), additional gas flows to the mixing zone (22) as the hammer ball accelerates towards the piezoelectric crystal (19). In other embodiments, the hammer ball may uncover flow by-pass at one or more points, allowing additional gas to be supplied to the injector tube and finally to the ignition zone.

Figure 4:
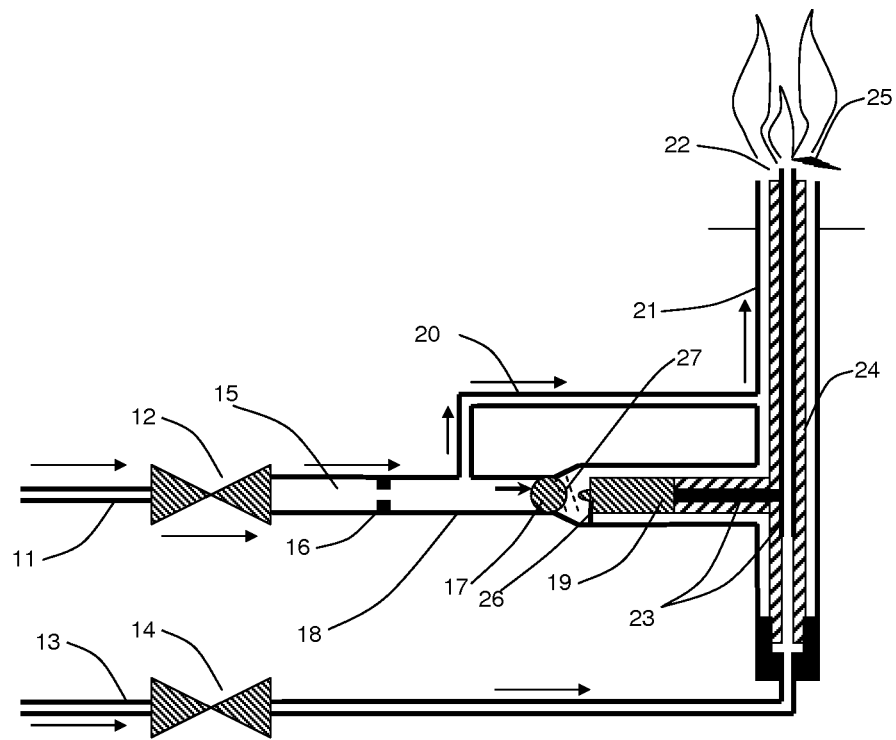
FIG. 4 is a schematic diagram illustrating the third step in the sequence of operation of the embodiment of the present invention when the hammer ball impacts the piezoelectric crystal and causes a discharge spark.

In FIG. 4, the hammer ball (17) impacts the piezoelectric crystal (19) and causes discharge spark (25) to ignite combustible gas mixture in the mixing zone (22).

Figure 5:
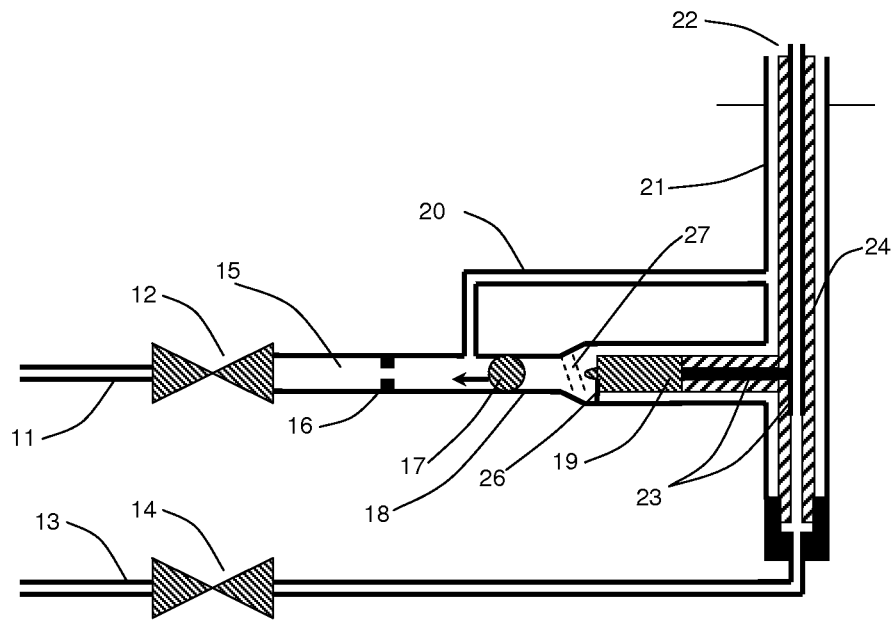
FIG. 5 is a schematic diagram illustrating the fourth step in the sequence of operation of the embodiment of the present invention when the hammer ball returns to the magnet.

As shown in FIG. 5, when the gas supply valves (12, 14) are turned off, the hammer ball (17) returns to the magnet (16), either by magnetic attraction or with the aid of the optional return spring (27), or some combination of these methods. After the return of the ball to its original position, the ignition device is then ready to provide additional ignition sparks when the fuel inlet valve (12) is again opened. The embodiment as described provides a spark each time the gas supply valves are opened.

Figure 6:
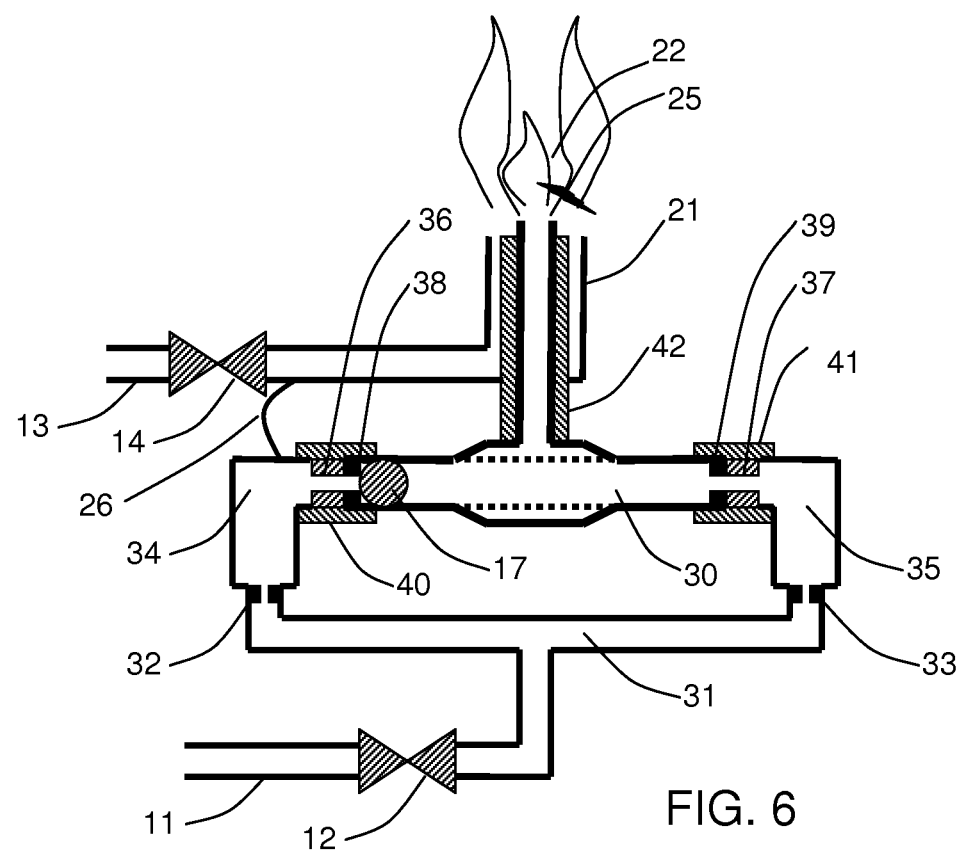
FIG. 6 is a schematic diagram illustrating the parts of an alternative embodiment of the embodiment of the present invention wherein there are two piezoelectric crystals used to produce a repetitive series of sparks.

FIG. 6 shows an alternate embodiment capable of driving a hammer ball in an oscillating manner, wherein each magnet is in contact with a piezoelectric crystal thereby functioning as an anvil (anvil magnet), thereby producing a repetitive series of sparks when gas flow is supplied. The hammer ball is driven alternately from one side to the other, impacting anvil magnets at each end, and causing the piezoelectric crystals to create repetitive discharge sparks.

In this alternative embodiment, there are two piezoelectric crystals (36) and (37), each directly in contact with anvil magnets (38) and (39), each with upstream charging chambers (34) and (35). When the fuel gas valve (12) is opened, gas enters a distribution flow path (31) and is supplied to each said charging chamber through charging orifices (32 and 33). The first charging chamber (34) is supplied with gas through the first charging orifice (32), and the second charging chamber (35) is supplied with gas through the second charging orifice (33). The piezoelectric crystal can be anchored next to the anvil magnet in contact with it or it can be attached directly to the piezoelectric crystal in contact with it.

The first charging chamber (34) has an outlet path through or around the first piezoelectric crystal (36), and the second charging chamber (35) has an outlet path through or around the second piezoelectric crystal (37). Each of the outlet paths through or around piezoelectric crystals (36 and 37) attach to opposing ends of the oscillating ball guide tube (30).

The oscillating ball guide tube (30) is sized to contain the hammer ball (17), and furthermore has an intersecting outlet flow path allowing any flow entering the oscillating ball guide tube (30) to move up the injector tube (21) and enter the ignition zone (22).

The path connecting the oscillating ball guide tube (30) to the injector tube (21) is shown at the center of the oscillating ball guide tube in FIG. 6, although this is not necessarily a requirement of the embodiment of the present invention, and alternative, asymmetrical arrangements could be employed.

A magnet is employed between each piezoelectric crystal (37) and (36) and the oscillating ball guide tube (30). These magnets are bonded to, or are in contact with, the piezoelectric crystal, such that when the hammer ball (17) impacts one of the magnets, the impulse is transferred to the contacting piezoelectric crystal. Hence, as illustrated in FIG. 6, these magnets function as anvils. The magnet adjoining the first piezoelectric crystal (36) is referred to as the first anvil magnet (38), and the magnet adjoining the second piezoelectric crystal (37) is referred to as the second anvil magnet (39). This configuration combining the anvil and magnet functions is not mandatory for the invention, and alternative configurations with separate anvils and retaining magnets may be employed.

An additional feature of anvil magnets (38 and 39) is that they have a flow path through or around them that is blocked by the hammer ball (17) when the hammer ball is in contact with, or drawn into close proximity of, either anvil magnet.

Prior to opening fuel inlet valve (12), hammer ball (17) will normally reside in contact with either the first anvil magnet (38) or the second anvil magnet (39), depending on where operation of the device was last stopped. If hammer ball (17) is residing in contact with the first anvil magnet (38) when fuel inlet valve (12) is opened, pressure will increase substantially in the first charging chamber (34), since flow cannot escape.

If the hammer ball (17) is residing in contact with second anvil magnet (39), and provided that first charging orifice (32) is properly sized relative to the open flow path through or around the first piezoelectric crystal (36) and first anvil magnet (38), the increase in pressure in the first charging chamber (34) will be relatively small when the fuel inlet valve (12) is opened.

Proper sizing of the first charging orifice (32) relative to the downstream flow path through or around the first piezoelectric crystal (36) and anvil magnet (38) to achieve this pressure condition is comprised of assuring that the first charging orifice (32) provides more flow restriction compared to the flow restriction in the downstream open flow paths. In this embodiment of the present invention an identical condition and design requirement applies to the second charging chamber (35), associated flow paths, and second charging orifice (33).

When the above design conditions are met, opening the fuel inlet valve (12) will cause gas to flow through the unblocked charging chamber (35 or 34), into the oscillating ball guide tube (30), and towards the ignition zone (22). Meanwhile, pressure will increase in the opposite charging chamber (34 or 35) for which the outlet flow path is blocked by the hammer ball (17). When the force caused by the pressure in the blocked charging chamber exceeds the retaining force of the appropriate anvil magnet (38 or 39), the hammer ball (17) will be released and accelerated by the high pressure gas contained in the said charging chamber. The hammer ball (17) will then impact the opposing anvil magnet (39 or 38), causing a high voltage to be produced by the associated piezoelectric crystal and simultaneously blocking the flow path through or around the newly contacted anvil magnet. Pressure will then increase in the charging chamber associated with the newly blocked flow path until it is sufficient to cause the hammer ball (17) to be released and accelerate back to the first anvil magnet. This process will repeat itself indefinitely, creating repetitive discharge sparks (25), so long as fuel gas is supplied through fuel inlet valve (12), and sufficient pressure drop is available from fuel supply line (11) to the ignition zone (22) to drive the hammer ball (17) off the anvil magnets (38 or 39).

Should the injector tube (21) and ignition zone (22) discharge directly into a rocket engine or some other downstream combustion chamber, an additional feature of this embodiment of the present invention is that, when ignition takes place and the downstream combustion chamber pressure rises such that the pressure in the ignition zone (22) also becomes elevated, it is possible to select a supply pressure to the fuel supply line (11) that will then be insufficient to overcome the retaining force between the anvil magnets (38 or 39) and the hammer ball (17). Oscillation of the hammer ball and resulting repetitive spark generation will then cease. Should the downstream rocket engine or other combustion chamber "flame out", the pressure at ignition zone (22) will drop and the oscillatory process will then automatically resume to provide repetitive discharge sparks (25) and attempt to re-ignite combustion.

An additional advantage of this embodiment of the present invention is that the hammer ball (17) is attracted to either the first or second anvil magnet when gas supply is turned off, eliminating need for a spring or other optional mechanism to assure the hammer ball is properly repositioned following operation.

The oxidizer supply valve (14), may be opened prior to, concurrently, or after the fuel inlet valve (12) is opened, depending on other considerations of the combustion ignition process. Timing of the oxidizer supply flow is not critical with respect to the spark generation process.

Although the second, or oscillatory, embodiment discussed above and shown in FIG. 6 describes the device as operating with fuel being used as the driving gas, the embodiment of the present invention could equally be configured to employ the oxidizer as the driving gas, or might even make use of a third inert gas, such as nitrogen, to operate the device. Also, as with the first, or baseline, embodiment, other factors may dictate which gas is supplied through the core region of the injector tube (21) and which gas is supplied through the annular region surrounding the core.

Figure 7:
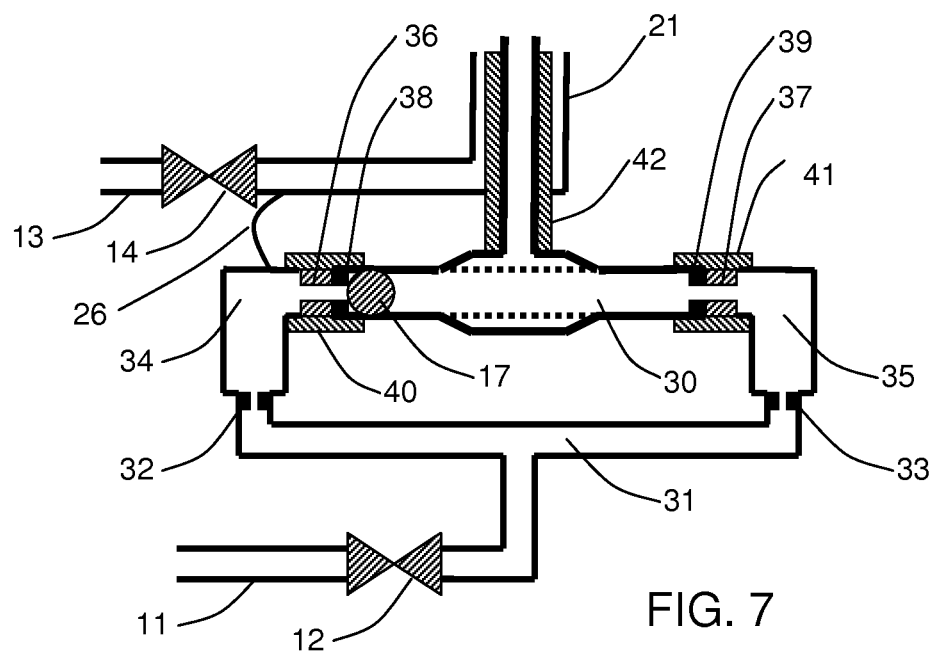
FIG. 7 is a schematic diagram illustrating the first step in the sequence of operation of the alternative embodiment of the embodiment of the present invention with two piezoelectric crystals when the hammer ball is rested in a seated position.

FIGS. 7 through 11 illustrate the oscillatory process of the second, or oscillatory, embodiment of the present invention. To begin this series of illustrations, it is assumed that the process starts with hammer ball (17) resting in a seated position against the first anvil magnet (38), as shown in FIG. 7.

Figure 8:
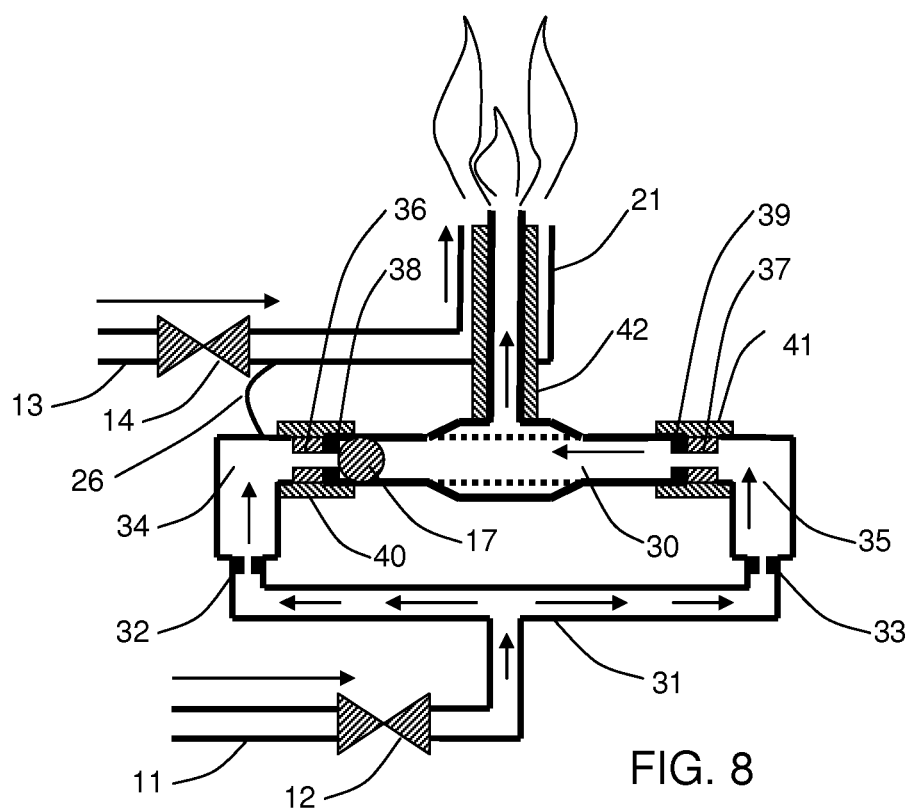
FIG. 8 is a schematic diagram illustrating the first step in the sequence of operation of the alternative embodiment of the present invention with two piezoelectric crystals when the fuel and oxidizer valves have just been opened.

In FIG. 8, fuel and oxidizer valves (12) and (14) have just been opened, and pressure starts to build in first charging chamber (34) that is blocked by hammer ball (17), while gas flows freely through the second charging chamber (35) to supply the injector tube (21) and ignition zone (22). Arrows are included in FIG. 8 to illustrate the flow of gases.

Figure 9:
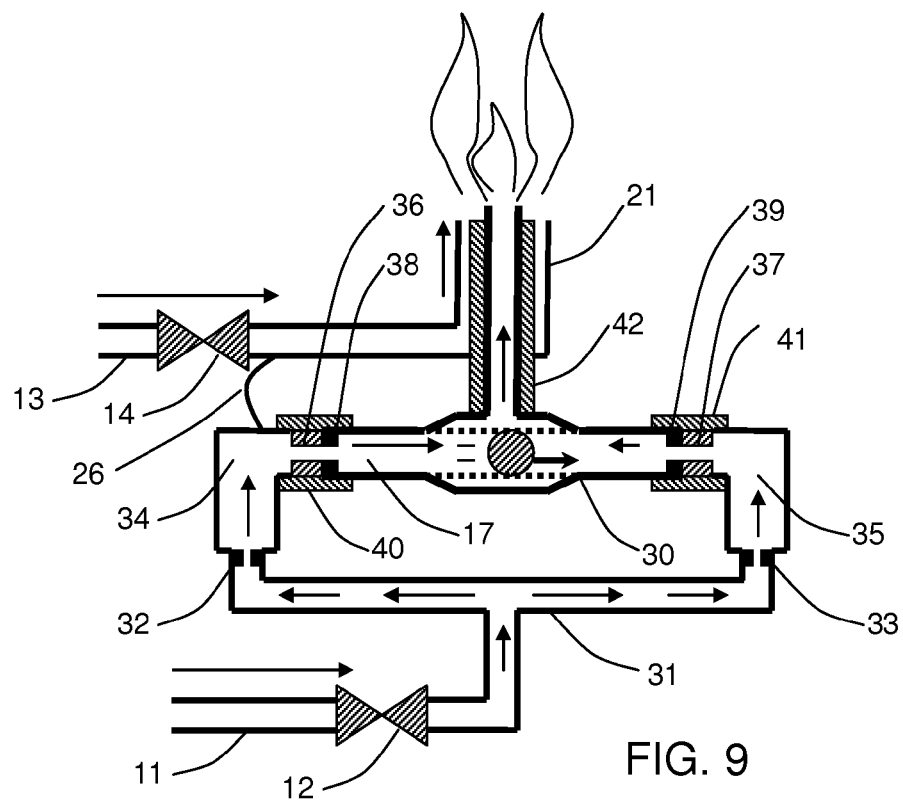
FIG. 9 is a schematic diagram illustrating the first step in the sequence of operation of the alternative embodiment of the present invention with two piezoelectric crystals when the hammer ball has been released from the first anvil magnet.

In FIG. 9, sufficient pressure has been reached in the first charging chamber (34), and the hammer ball (17) has been released from first anvil magnet (38) and is being accelerated towards second anvil magnet (39). The bold arrow indicates the direction of motion of the hammer ball (17).

Figure 10:
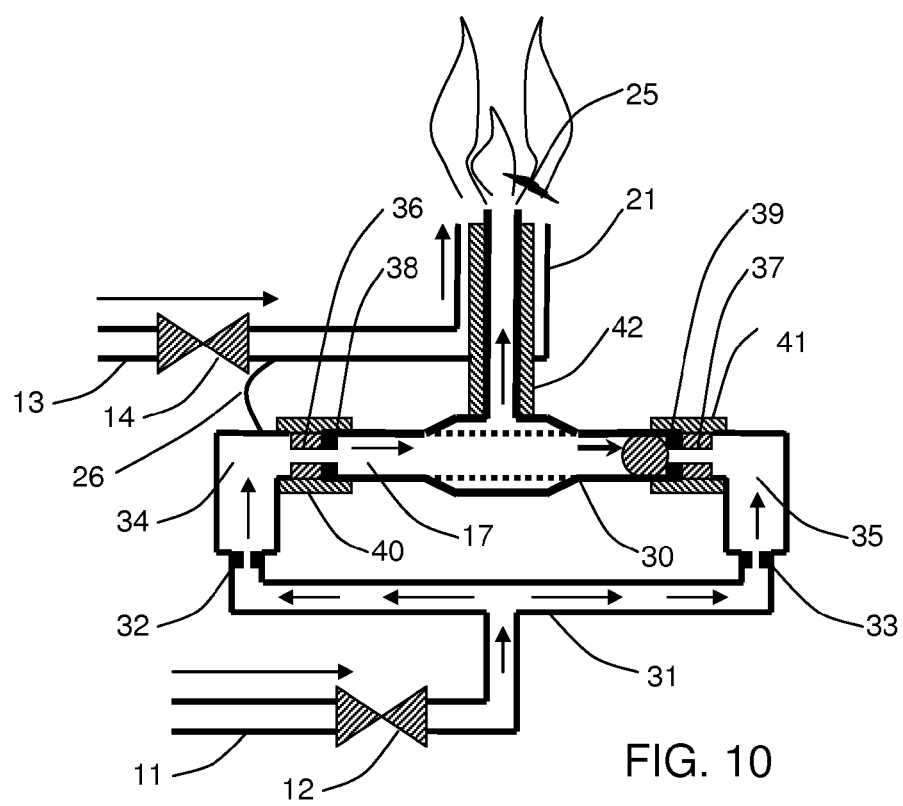
FIG. 10 is a schematic diagram illustrating the first step in the sequence of operation of the alternative embodiment of the present invention with two piezoelectric crystals when the hammer ball is impacting the second magnet.

FIG. 10 shows hammer ball (17) impacting second anvil magnet (39), transferring impulse to second piezoelectric crystal (37), and causing discharge spark (25). Hammer ball (17) is now blocking flow from passing through or around second anvil magnet (39), and the pressure in second charging chamber (35) consequently increases, while gas flows freely through the first charging chamber (34) to supply the injector tube (21) and ignition zone (22).

Figure 11:
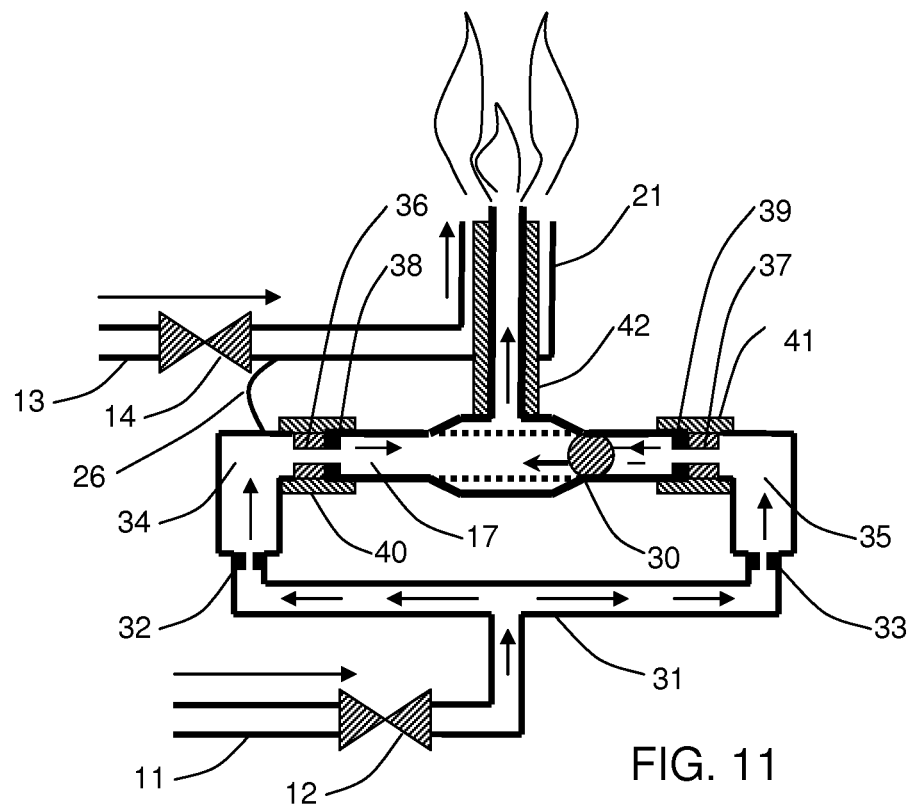
FIG. 11 is a schematic diagram illustrating the first step in the sequence of operation of the alternative embodiment of the present invention with two piezoelectric crystals when the hammer ball is driven back towards the first anvil magnet.

FIG. 11 shows conditions occurring soon after pressure in second charging chamber (35) has reached a level sufficient to drive hammer ball (17) from second anvil magnet (39). Hammer ball (17) is driven back towards first anvil magnet (38) and first piezoelectric crystal (36). This process repeats itself, causing multiple discharge sparks as the hammer ball alternately impacts alternate anvil magnets (38 and 39), transferring impulse to the piezoelectric crystals (36 and 37).

One disadvantage of the second embodiment, oscillating piezoelectric igniter, shown in FIGS. 6 through 11 is that it uses two piezoelectric crystals arranged in a roughly symmetrical manner. Operation of the two piezoelectric crystals in parallel might be undesirable.

A third embodiment of the present invention provides an alternate oscillating piezoelectric igniter using one piezoelectric crystal resembling the first embodiment of the present invention in FIG. 1, while retaining the oscillating characteristics of the second embodiment of FIG. 6. An additional feature of the third embodiment is that it does not require magnets to maintain oscillation of the hammer ball, although one or more magnets may be employed to position the hammer ball prior to start.

Figure 12:
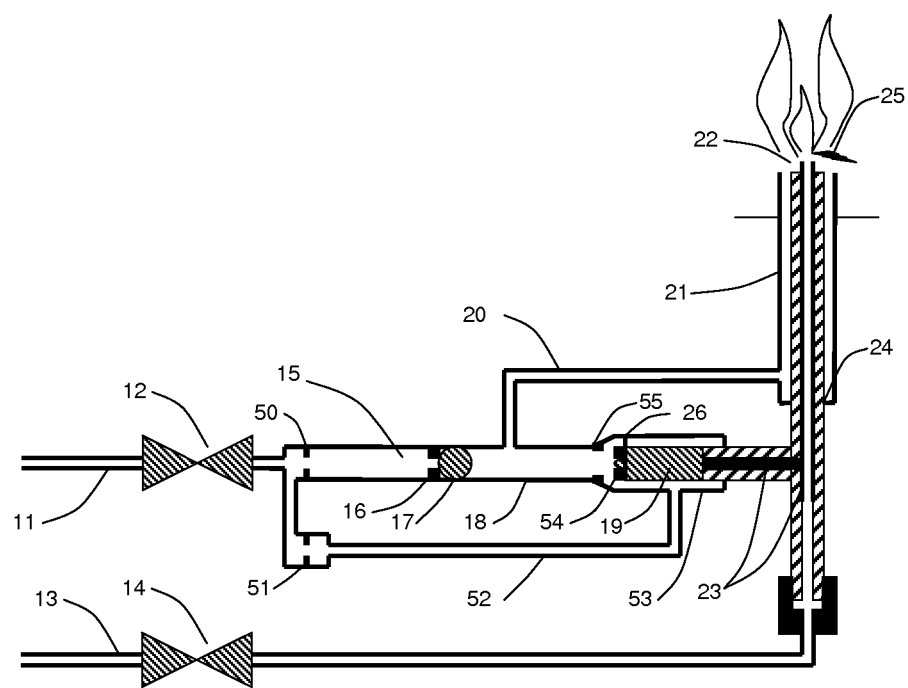
FIG. 12 is a schematic diagram illustrating the parts of an alternative embodiment of the present invention wherein there is one piezoelectric crystal with an oscillating igniter.

The third embodiment, shown in FIG. 12, is accomplished by adding the following components to the first embodiment: isolated return gas chamber (53) surrounding the piezoelectric crystal (19), an isolated return chamber gas supply path (52), and primary and secondary charging orifices (50 and 51). Optional components include a return anvil magnet (54), and a return chamber seal (55) to better seal the orifices where the gas is entering when the hammer ball is in place restricting flow. The return chamber seal means can be any acceptable means of making a seal around the hammer ball so as to sufficiently restrict flow from the orifices.

The primary charging orifice (50) restricts flow entering the upstream gas chamber (15) from the fuel inlet valve (12), while the secondary charging orifice (51) restricts flow entering the return gas chamber (53) from the fuel inlet valve (12).

When the fuel inlet valve (12) is opened, gas flows into the upstream gas chamber (15), increasing pressure in the upstream gas chamber in a manner identical to that in the first embodiment, until hammer ball (17) is driven towards the piezoelectric crystal (19).

In the third embodiment of the invention, the return anvil magnet (54) will retain the hammer ball (17) such that the return gas chamber (53) is sealed and will increase in pressure due to flow supplied through the return chamber gas supply path (52). When return gas chamber (53) pressure builds sufficiently, the hammer ball (17) will release from the return anvil magnet (54) to again become seated in the primary magnet (16).

Alternatively, with proper sizing of the primary and secondary charging orifices, and proper selection of the length of the guide tube and mass of the hammer ball, it is possible to cause the hammer ball to oscillate and repetitively impact the piezoelectric crystal without the need for magnets (16 and 54) and associated seals. The hammer ball is then operated continuously in a cycle to create reciprocating repeating sparks so long as needed.

This can be made to occur by sizing the secondary charging orifice (51) such that pressure in the return gas chamber (53) does not increase so rapidly that the hammer ball reverses direction prior to impacting the piezoelectric crystal, yet increases sufficiently to drive the hammer ball back towards the primary charging orifice (16). Similarly, the primary charging orifice (16) can be sized to cause sufficient pressure to build up in the upstream gas chamber (15) without contacting the primary magnet (16), such that the hammer ball reverses direction and is accelerated with sufficient velocity to again impact the piezoelectric crystal with sufficient impulse to generate the required spark. This oscillating process will continue as long as the fuel inlet valve (12) is open and sufficient pressure drop is available between the fuel supply line (11) and the ignition zone (22).

As with the second embodiment, should the injector tube (21) and ignition zone (22) discharge directly into a rocket engine or some other downstream combustion chamber, an additional feature of this embodiment is that, when ignition takes place and the downstream combustion chamber pressure rises such that the pressure in the ignition zone (22) also becomes elevated, it is possible to select a supply pressure to the fuel supply line (11) that will then be insufficient to overcome the retaining force between the magnets (16 or 54) and the hammer ball (17), or otherwise be insufficient to maintain oscillation of the hammer ball. Oscillation of the hammer ball and resulting repetitive spark generation will then cease. Should the downstream rocket engine or other combustion chamber "flame out", the pressure at ignition zone (22) will drop and the oscillatory process will then automatically resume to provide repetitive discharge sparks (25) and attempt to re-ignite combustion.

Although the embodiments discussed above and illustrated in FIGS. 1 through 12 employ one or more magnets for retaining the hammer ball until sufficient pressure is developed, the use of these magnets may be convenient but is not mandatory or essential to the operation of the current invention.

Figure 13:
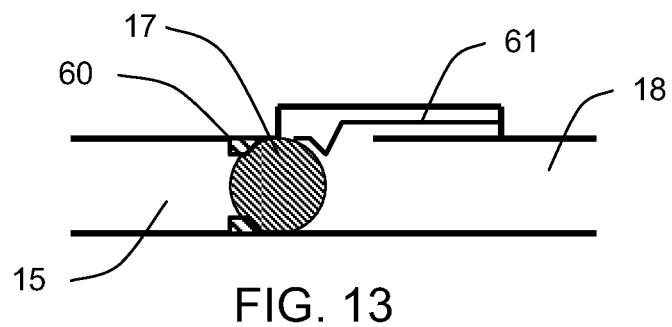
FIG. 13 is a schematic diagram illustrating the parts of a third alternative embodiment of a portion of the present invention showing a mechanical method for retaining the hammer ball on a seat.

FIG. 13 illustrates one possible alternative, mechanical, method for retaining the hammer ball on a seat, in such a way that a controlled pressure will be built up, followed by rapid release of the hammer ball. The hammer ball (17) is retained on the seat (60), by virtue of a spring steel retainer (61). With proper design of the flexible retainer mechanism (61) a positive force will be applied to the hammer ball (17), keeping the hammer ball on the seat (60) to seal gas flow, until sufficient pressure has built up in the upstream gas chamber (15) to deflect the flexible retainer mechanism (61) and allow the hammer ball to be released into the guide tube (18). The flexible retainer mechanism could be made from a variety of materials, such as spring steel.

Figure 14:
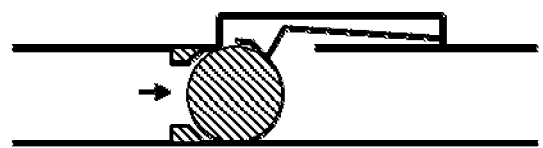
FIG. 14 is a schematic diagram illustrating the operation of an alternative embodiment of a portion of the present invention using a mechanical method for retaining the hammer ball on a seat showing the deflection of the retainer mechanism.
Figure 15:
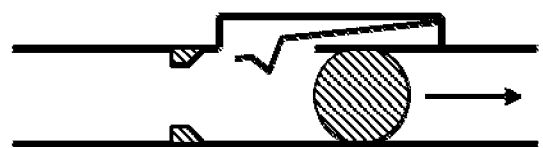
FIG. 15 is a schematic diagram illustrating the operation of an alternative embodiment of a portion of the present invention using a mechanical method for retaining the hammer ball on a seat showing the release of the retainer mechanism when pressure is applied to the upstream gas chamber.

FIGS. 14 and 15 illustrate the deflection and release of the retainer mechanism when pressure is applied to the upstream gas chamber (15).

Furthermore, although the hammering element is always described and drawn as a spherical ball, this also is not an essential feature of the invention. Other hammer shapes, such as cylindrical, could be employed, and might be found advantageous, rather than a spherical ball. Further, the hammer ball itself could be made of any sufficiently strong magnetic material such as Niobium, with the fixed magnets replaced by any suitable ferromagnetic material, thereby producing a similar attractive effect. In addition, the hammer ball could be positioned so as to momentarily block the flow out of an alternate gas charging chamber or chambers causing pressure to build while flow through the opposite magnet and crystal or other ignition means supplied flow to the injector.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A propellant flow actuated piezoelectric igniter, suitable for ignition of rocket and gas turbine engines comprising: a fuel supply line connected to a fuel inlet valve; an oxidizer supply line connected to an oxidizer inlet valve; the fuel inlet valve connected to an upstream gas chamber; a magnet; a hammer ball held next to the magnet by magnetic force; one end of a guide tube surrounding the hammer ball to guide the hammer ball when it is released from the magnet; a piezoelectric crystal at the opposite distal end of the guide tube away from the magnet; a spring at the opposite distal end of the guide tube away from the hammer ball; an injector tube surrounding the piezoelectric crystal connected to the guide tube; an orifice for a propellant to flow into and build pressure in the upstream gas chamber behind the hammer ball; a flow by-pass pathway means between the guide tube and the injector tube; an ignition zone at the distal end of the guide tube next to the piezoelectric crystal; a conduction path electrode leading from the piezoelectric crystal to the ignition zone; a grounding connection for the piezoelectric crystal; and a high dielectric strength insulating material surrounding the conduction path electrode such that a discharge spark is created at the ignition zone when the hammer ball strikes the piezoelectric crystal; wherein the spring is used to return the hammer ball to its original position.

2. A propellant flow actuated piezoelectric igniter suitable for ignition of rocket and gas engines as claimed in claim 1 wherein the hammer ball uncovers flow by-pass at one or more points, allowing additional gas to be supplied to the injector tube and finally to the ignition zone.

3. A propellant flow actuated piezoelectric igniter suitable for ignition of rocket and gas engines as claimed in claim 1 wherein the hammer ball is driven by the gas in an oscillating manner, thereby producing a repetitive series of sparks when gas flow is supplied.

4. A propellant flow actuated piezoelectric igniter suitable for ignition of rocket and gas engines as claimed in claim 1 wherein an adjustable separator means is placed between the hammer ball and each magnet so as to be able to adjust the amount of magnetic force holding the hammer ball in place at each magnet.

5. A propellant flow actuated piezoelectric igniter suitable for ignition of rocket and gas turbine engines as claimed in claim 1 wherein leakage of combustion fuel flowing past the hammer ball is sufficient to supply combustion fuel to the ignition zone.

6. A propellant flow actuated piezoelectric rocket engine igniter suitable for ignition of rocket and gas turbine engines as claimed in claim 1 wherein insulated wires are used to convey electrical energy generated by the piezoelectric crystal to the ignition zone.

7. A propellant flow actuated piezoelectric igniter suitable for ignition of rocket and gas turbine engines as claimed in claim 1 wherein the magnet itself has sufficient magnetic attraction to return the hammer ball after it has struck the piezoelectric crystal to its original position.

8. A propellant flow actuated piezoelectric igniter suitable for ignition of rocket and gas turbine engines as claimed in claim 1 wherein gravity is employed to return the hammer ball.

9. A propellant flow actuated piezoelectric rocket engine igniter suitable for ignition of rocket and gas turbine engines as claimed in claim 1 wherein are return means is used to return the ball to its original position.

10. A propellant flow actuated piezoelectric igniter suitable for ignition of rocket and gas turbine engines as claimed in claim 1 wherein propellant used to power the hammer ball is a combustible fuel gas.

11. A propellant flow actuated piezoelectric igniter suitable for ignition of rocket and gas turbine engines as claimed in claim 1 wherein the hammer ball is operated by an oxidizer gas.

12. A propellant flow actuated piezoelectric igniter suitable for ignition of rocket and gas turbine engines as claimed in claim 1 wherein the hammer ball is operated by a third inert gas.

13. A propellant flow actuated piezoelectric igniter suitable for ignition of rocket and gas turbine engines as claimed in claim 12 wherein the third inert gas is nitrogen.

14. A propellant flow actuated piezoelectric igniter suitable for ignition of rocket and gas turbine engines as claimed in claim 1 wherein a cryogenic propellant is supplied to the upstream gas chamber.

15. A propellant flow actuated piezoelectric igniter suitable for ignition of rocket and gas turbine engines as claimed in claim 14 wherein the cryogenic propellant supplied to the upstream gas chamber is liquid hydrogen.

16. A propellant flow actuated piezoelectric igniter suitable for ignition of rocket and gas turbine engines as claimed in claim 14 wherein the cryogenic propellant supplied to the upstream gas chamber is liquid oxygen.

17. A propellant flow actuated piezoelectric igniter, suitable for ignition of combustion devices comprising:
  a fuel supply line connected to a fuel inlet valve;
  an oxidizer supply line connected to an oxidizer inlet valve;
  the fuel inlet valve connected to an upstream gas chamber;
  a magnet;
  a hammer ball held next to the magnet by magnetic force;
  one end of a guide tube surrounding the hammer ball to guide the hammer ball when it is released from the magnet;
  a piezoelectric crystal at the opposite distal end of the guide tube away from the magnet;
  an injector tube surrounding the piezoelectric crystal connected to the guide tube;
  an orifice for a propellant to flow into and build pressure in the upstream gas chamber behind the hammer ball;
  a flow by-pass pathway means between the guide tube and the injector tube;
  an ignition zone at the distal end of the guide tube next to the piezoelectric crystal;
  a conduction path electrode leading from the piezoelectric crystal to the ignition zone wherein the electrode is comprised of a hollow tube;
  a grounding connection for the piezoelectric crystal; and
  a high dielectric strength insulating material surrounding the conduction path electrode such that a discharge spark is created at the ignition zone when the hammer ball strikes the piezoelectric crystal.

18. A propellant flow actuated piezoelectric igniter, suitable for ignition of combustion devices comprising:
  a fuel supply line connected to a fuel inlet valve;
  an oxidizer supply line connected to an oxidizer inlet valve;

the fuel inlet valve connected to an upstream gas chamber;
a magnet;
a hammer ball held next to the magnet by magnetic force;
one end of a guide tube surrounding the hammer ball to guide the hammer ball when it is released from the magnet;
a piezoelectric crystal at the opposite distal end of the guide tube away from the magnet;
an injector tube surrounding the piezoelectric crystal connected to the guide tube;
an orifice for a propellant to flow into and build pressure in the upstream gas chamber behind the hammer ball;
a flow by-pass pathway means between the guide tube and the injector tube;
an ignition zone at the distal end of the guide tube next to the piezoelectric crystal;
a conduction path electrode leading from the piezoelectric crystal to the ignition zone wherein the electrode is a solid rod;
a grounding connection for the piezoelectric crystal; and
a high dielectric strength insulating material surrounding the conduction path electrode such that a discharge spark is created at the ignition zone when the hammer ball strikes the piezoelectric crystal.

19. A propellant flow actuated piezoelectric igniter, suitable for ignition of combustion devices comprising:
a fuel supply line connected to a fuel inlet valve;
an oxidizer supply line connected to an oxidizer inlet valve;
the fuel inlet valve connected to an upstream gas chamber;
a magnet, the magnet functioning as an anvil by being in direct contact with a piezoelectric crystal;
a hammer ball held next to the magnet by magnetic force;
one end of a guide tube surrounding the hammer ball to guide the hammer ball when it is released from the magnet;
a piezoelectric crystal at the opposite distal end of the guide tube away from the magnet;
an injector tube surrounding the piezoelectric crystal connected to the guide tube;
an orifice for a propellant to flow into and build pressure in the upstream gas chamber behind the hammer ball;
a flow by-pass pathway means between the guide tube and the injector tube;
an ignition zone at the distal end of the guide tube next to the piezoelectric crystal;
a conduction path electrode leading from the piezoelectric crystal to the ignition zone;
a grounding connection for the piezoelectric crystal; and
a high dielectric strength insulating material surrounding the conduction path electrode such that a discharge spark is created at the ignition zone when the hammer ball strikes a piezoelectric crystal.

20. A propellant flow actuated piezoelectric igniter as claimed in claim 19 wherein an anvil magnet transfers the force to the crystal.

21. A propellant flow actuated piezoelectric igniter, suitable for ignition of combustion devices comprising:
a fuel supply line connected to a fuel inlet valve;
an oxidizer supply line connected to an oxidizer inlet valve;
the fuel inlet valve connected to an upstream gas chamber;
a magnet;
a hammer ball held next to the magnet by magnetic force;
one end of a guide tube surrounding the hammer ball to guide the hammer ball when it is released from the magnet;
the hammer ball oscillating against the piezoelectric crystal at the opposite distal end of the guide tube away from the magnet, wherein the piezoelectric crystal is surrounded by an isolated return chamber gas supply path;
an injector tube surrounding the piezoelectric crystal connected to the guide tube;
an orifice for a propellant to flow into and build pressure in the upstream gas chamber behind the hammer ball;
a flow by-pass pathway means between the guide tube and the injector tube;
an ignition zone at the distal end of the guide tube next to the piezoelectric crystal;
a conduction path electrode leading from the piezoelectric crystal to the ignition zone;
a grounding connection for the piezoelectric crystal; and
a high dielectric strength insulating material surrounding the conduction path electrode such that a discharge spark is created at the ignition zone when the hammer ball strikes the piezoelectric crystal.

22. A propellant flow actuated piezoelectric igniter, suitable for ignition of combustion devices comprising:
a fuel supply line connected to a fuel inlet valve;
an oxidizer supply line connected to an oxidizer inlet valve;
the fuel inlet valve connected to an upstream gas chamber;
a magnet;
a hammer ball held next to the magnet by magnetic force;
one end of a guide tube surrounding the hammer ball to guide the hammer ball when it is released from the magnet;
a piezoelectric crystal at the opposite distal end of the guide tube away from the magnet;
an injector tube surrounding the piezoelectric crystal connected to the guide tube;
a plurality of orifices for a propellant to flow into and build pressure in the upstream gas chamber behind the hammer ball, wherein the orifices from which gas flow enters are sealed with a return chamber seal means;
a flow by-pass pathway means between the guide tube and the injector tube;
an ignition zone at the distal end of the guide tube next to the piezoelectric crystal;
a conduction path electrode leading from the piezoelectric crystal to the ignition zone;
a grounding connection for the piezoelectric crystal; and
a high dielectric strength insulating material surrounding the conduction path electrode such that a discharge spark is created at the ignition zone when the hammer ball strikes the piezoelectric crystal.

23. A propellant flow actuated piezoelectric igniter, suitable for ignition of combustion devices comprising:
a fuel supply line connected to a fuel inlet valve;
an oxidizer supply line connected to an oxidizer inlet valve;
the fuel inlet valve connected to an upstream gas chamber;
a magnet;
a hammer ball held next to the magnet by magnetic force;
one end of a guide tube surrounding the hammer ball to guide the hammer ball when it is released from the magnet;
the guide tube sized so leakage of flow past the hammer ball as it moves through the guide tube is also routed to the injector tube sufficiently to supply combustion fuel to the ignition zone so that there is no need for a flow by-pass path;
a piezoelectric crystal at the opposite distal end of the guide tube away from the magnet;
an injector tube surrounding the piezoelectric crystal connected to the guide tube;
an orifice for a propellant to flow into and build pressure in the upstream gas chamber behind the hammer ball;

an ignition zone at the distal end of the guide tube next to the piezoelectric crystal;

a conduction path electrode leading from the piezoelectric crystal to the ignition zone;

a grounding connection for the piezoelectric crystal; and a high dielectric strength insulating material surrounding the conduction path electrode such that a discharge spark is created at the ignition zone when the hammer ball strikes the piezoelectric crystal.

24. A propellant flow actuated piezoelectric igniter, suitable for ignition of combustion devices comprising:

a fuel supply line connected to a fuel inlet valve;

an oxidizer supply line connected to an oxidizer inlet valve;

the fuel inlet valve connected to an upstream gas chamber;

a magnet;

a hammer ball held next to the magnet by magnetic force;

one end of a guide tube surrounding the hammer ball to guide the hammer ball when it is released from the magnet;

a piezoelectric crystal at the opposite distal end of the guide tube away from the magnet;

an injector tube surrounding the piezoelectric crystal connected to the guide tube;

an orifice for a propellant to flow into and build pressure in the upstream gas chamber behind the hammer ball;

a flow by-pass pathway means between the guide tube and the injector tube;

an ignition zone at the distal end of the guide tube next to the piezoelectric crystal;

a conduction path electrode leading from the piezoelectric crystal to the ignition zone;

a grounding connection for the piezoelectric crystal; and a high dielectric strength insulating material surrounding the conduction path electrode such that a discharge spark is created at the ignition zone when the hammer ball strikes the piezoelectric crystal; and one type of propellant is used to actuate the piezoelectric crystal through a center core of the injector, and another type of propellant is delivered through an annular region surrounding the core.

25. A propellant flow actuated piezoelectric igniter suitable for ignition of rocket and gas turbine engines as claimed in claim 1 wherein the hammer ball itself is comprised of a magnetic material.

26. A propellant flow actuated piezoelectric igniter, suitable for ignition of combustion devices comprising:

a fuel supply line connected to a fuel inlet valve;

an oxidizer supply line connected to an oxidizer inlet valve;

the fuel inlet valve connected to an upstream gas chamber;

a magnet;

a hammer ball comprised of niobium is held next to the magnet by magnetic force;

one end of a guide tube surrounding the hammer ball to guide the hammer ball when it is released from the magnet;

a piezoelectric crystal at the opposite distal end of the guide tube away from the magnet;

an injector tube surrounding the piezoelectric crystal connected to the guide tube;

an orifice for a propellant to flow into and build pressure in the upstream gas chamber behind the hammer ball;

a flow by-pass pathway means between the guide tube and the injector tube;

an ignition zone at the distal end of the guide tube next to the piezoelectric crystal;

a conduction path electrode leading from the piezoelectric crystal to the ignition zone;

a grounding connection for the piezoelectric crystal; and a high dielectric strength insulating material surrounding the conduction path electrode such that a discharge spark is created at the ignition zone when the hammer ball strikes the piezoelectric crystal.

* * * * *